(12) United States Patent
Takada et al.

(10) Patent No.: US 11,388,069 B2
(45) Date of Patent: Jul. 12, 2022

(54) MAINTENANCE TASK MANAGEMENT DEVICE AND MAINTENANCE TASK MANAGEMENT METHOD

(71) Applicant: Nippon Telegraph and Telephone Corporation, Tokyo (JP)

(72) Inventors: Atsushi Takada, Musashino (JP); Kyoko Yamagoe, Musashino (JP); Naoyuki Tanji, Musashino (JP); Chihiro Maru, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/264,382

(22) PCT Filed: Jul. 12, 2019

(86) PCT No.: PCT/JP2019/027631
§ 371 (c)(1),
(2) Date: Jan. 29, 2021

(87) PCT Pub. No.: WO2020/026759
PCT Pub. Date: Feb. 6, 2020

(65) Prior Publication Data
US 2021/0281494 A1    Sep. 9, 2021

(30) Foreign Application Priority Data

Jul. 31, 2018 (JP) .............................. JP2018-143319

(51) Int. Cl.
*H04L 41/5009*  (2022.01)
*H04L 41/5006*  (2022.01)
*H04L 41/5041*  (2022.01)

(52) U.S. Cl.
CPC ...... *H04L 41/5016* (2013.01); *H04L 41/5006* (2013.01); *H04L 41/5048* (2013.01)

(58) Field of Classification Search
CPC ............ H04L 41/5016; H04L 41/5006; H04L 41/5048
(Continued)

(56) References Cited

U.S. PATENT DOCUMENTS 7,600,007 B1 * 10/2009 Lewis .................... G06Q 10/04
                                                       709/223
7,930,681 B2 * 4/2011 Kloeffer .................... G06F 8/65
                                                       717/120
(Continued)

FOREIGN PATENT DOCUMENTS

JP    2011-28490     2/2011
JP    2011-129055    6/2011
(Continued)

OTHER PUBLICATIONS

M. Xia, M. Batayneh, L. Song, C. U. Martel and B. Mukherjee, "SLA-Aware Provisioning for Revenue Maximization in Telecom Mesh Networks," IEEE GLOBECOM 2008—2008 IEEE Global Telecommunications Conference, 2008, pp. 1-5, doi: 10.1109/GLOCOM.2008.ECP.266. (Year: 2008).*
(Continued)

*Primary Examiner* — Melvin H Pollack
(74) *Attorney, Agent, or Firm* — Fish & Richardson P.C.

(57) ABSTRACT

[Problem] It is determined whether quick repair handling is required for a failure in a communication apparatus or in a communication service that occurs in a nighttime period in compliance with an SLA while curbing operating expenses. [Solution] A maintenance task management apparatus 11 determines handling of failures when both an apparatus failure that is a failure in communication apparatuses 46a and 46b in a nighttime period and a service failure that is a trouble in a communication service provided by the communication apparatuses 46a and 46b to users in the nighttime period occur or only the apparatus failure occurs. The
(Continued)

maintenance task management apparatus 11 includes a handling determination unit 23 and a handling control unit 31. The handling determination unit 23 determines whether service interruption of communication due to double failures, which are both the apparatus failure and the service failure, violates an SLA that is service level agreement with users when the double failures are detected. The handling control unit 31 performs control for transmitting a quick handling notification for requesting quick failure repair to a worker terminal 42 when it is determined that the service interruption violates the SLA.

10 Claims, 4 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 8,010,694 | B2* | 8/2011 | Doverspike | H04L 43/0823 |
| | | | | 709/235 |
| 8,238,253 | B2* | 8/2012 | Morrill | H04L 43/04 |
| | | | | 370/241 |
| 8,429,049 | B2* | 4/2013 | Smith | H04L 47/70 |
| | | | | 705/35 |
| 8,793,529 | B2* | 7/2014 | Lee | H04L 47/10 |
| | | | | 714/4.12 |
| 9,300,548 | B2* | 3/2016 | Asthana | H04L 41/5006 |
| 9,565,080 | B2* | 2/2017 | Jain | H04L 67/327 |
| 9,667,470 | B2* | 5/2017 | Prathipati | H04L 67/306 |
| 10,257,217 | B2* | 4/2019 | Hamdi | G06F 21/552 |
| 10,498,608 | B2* | 12/2019 | Sethi | H04L 43/10 |
| 10,574,513 | B2* | 2/2020 | Nagarajan | H04L 43/0805 |

FOREIGN PATENT DOCUMENTS

| | | |
|---|---|---|
| JP | 2013-30826 | 2/2013 |
| JP | 2017-175423 | 9/2017 |

OTHER PUBLICATIONS

Funmilade Faniyi and Rami Bahsoon. 2015. A Systematic Review of Service Level Management in the Cloud. <i>ACM Comput. Surv.</i> 48, 3, Article 43 (Feb. 2016), 27 pages. DOI:https://doi.org/10.1145/2843890 (Year: 2015).*

A. Autenrieth and A. Kirstadter, "Engineering end-to-end IP resilience using resilience-differentiated QoS," in IEEE Communications Magazine, vol. 40, No. 1, pp. 50-57, Jan. 2002, doi: 10.1109/35.978049. (Year: 2002).*

B. Schroeder and G. A. Gibson, "A Large-Scale Study of Failures in High-Performance Computing Systems," in IEEE Transactions on Dependable and Secure Computing, vol. 7, No. 4, pp. 337-350, Oct.-Dec. 2010, doi: 10.1109/TDSC.2009.4. (Year: 2010).*

Funakoshi et al., "Extreme value analysis for large scale outages of telecommunication networks," IEICE, Technical Report, 2013, 113(360):13-18, 17 pages.

Kazama et al., "Monitor and Surveillance System to provide an Operation Level Agreement," IEICE, Technical Report, 2010, 100(175):25-29, 15 pages (with English Translation).

Sato et al., "Proposal and Evaluation of Service Level Monitoring Platform for Cloud Services," IEICE, Technical Report, 2014, 114(299):87-92, 17 pages (with English Translation).

* cited by examiner

MAINTENANCE TASK MANAGEMENT DEVICE AND MAINTENANCE TASK MANAGEMENT METHOD

CROSS-REFERENCE TO RELATED APPLICATIONS

This application is a National Stage application under 35 U.S.C. § 371 of International Application No. PCT/JP2019/027631, having an International Filing Date of Jul. 12, 2019, which claims priority to Japanese Application Serial No. 2018-143319, filed on Jul. 31, 2018. The disclosure of the prior application is considered part of the disclosure of this application, and is incorporated in its entirety into this application.

TECHNICAL FIELD

The present disclosure relates to a maintenance task management apparatus and a maintenance task management method for determining handling of a failure in a communication apparatus that provides a communication service to a communication terminal of a user or the like.

BACKGROUND ART

Using communication apparatuses (or communication equipment), communication carriers have provided various communication services to communication terminals of users that are distributed over a wide range. The communication carriers have established 24-hour and 365-day maintenance systems by designing the communication apparatuses with redundancy with active and spare configurations for the purpose of improving service quality. When a failure occurs in a communication apparatus (referred to as an apparatus failure), quick failure recovery measures are taken while services are continued by the spare communication apparatuses.

However, to maintain large-scaled maintenance systems in weekday nighttime periods and weekends and holidays (hereinafter referred to as nighttime periods), more manpower costs are required than in weekday daytime periods (hereinafter referred to as daytime periods), and this leads to an increase in operating expenses (OPEX). However, weekday nighttime periods are time periods outside of business hours of communication carriers (for example, a daytime period from 9:00 to 17:00).

It is thus necessary to prepare criteria for appropriately determining whether repair for an apparatus failure occurring in a nighttime period can be carried out in the next daytime period. As a criterion for determining the necessity or unnecessary of handling an apparatus failure and priority of handling the apparatus failure, a service level agreement (SLA) made with a user is conceivable. It is assumed that the SLA is not limited to service quality specification values actually contracted with the user but is defined in a broad sense including target values of an operational service quality. Priority of maintenance is determined, and whether to quickly carry out maintenance is determined on the basis of the SLA. For example, a high-grade maintenance service is provided to a user with a high SLA.

As such determination based on the SLA, there is a service level monitoring platform described in Non Patent Literature 1. This technique enables monitoring of an SLA and thus efficient detection of violation of the SLA due to degradation (failure) of the service quality of a communication apparatus. Non Patent Literature 2 describes a system for monitoring equipment in accordance with a user grade. According to this technique, a function of dispatching an alarm in accordance with an SLA can determine failure handling priority based on details of a failure and criteria of the SLA. Note that the techniques described in Patent Literature 1 and Patent Literature 2 are additional examples of this type of technique.

CITATION LIST

Patent Literature

Patent Literature 1: JP 2017-175423 A
Patent Literature 2: JP 2011-129055 A

Non Patent Literature

Non Patent Literature 1; Tatsuya Sato and one other, "Proposal and Evaluation of Service Level Monitoring Platform for Cloud Services," The Institute of Electronics, Information and Communication Engineers, IEICE Technical Report, Vol. 114, No. 299, p 87 to 92, November. 2014.

Non Patent Literature 2: Takehiro Kazama and one other. "Monitor and Surveillance System to provide an Operation Level Agreement," The Institute of Electronics, Information and Communication Engineers, IEICE Technical Report, Vol. 100, No. 175, p 25 to 30, July. 2010.

SUMMARY OF THE INVENTION

Technical Problem

However, the techniques according to Non Patent Literature 1 and Non Patent Literature 2 described above do not have any criteria for effectively determining whether handling is required in a nighttime period for a failure in a communication apparatus or a trouble (failure) in a communication service that occurs in a nighttime period. In other words, there is a problem that it is not possible to determine whether quick repair is required fir the aforementioned failure in a nighttime period in compliance with an SLA while curbing operating expenses.

The present disclosure is made in view of such circumstances, and an object thereof is to provide a maintenance task management apparatus and a maintenance task management method with which it is possible to determine whether quick repair is required for a failure in a communication apparatus or in a communication service that occurs in a nighttime period in compliance with an SLA while curbing operating expenses.

Means for Solving the Problem

As a means for solving the aforementioned problems, the disclosure according to a first aspect provides a maintenance task management apparatus configured to determine handling of a failure when both an apparatus failure that is a failure of communication apparatuses in a nighttime period defined in advance and a service failure that is a trouble in a communication service provided by the communication apparatuses to users in the nighttime period occur or only the apparatus failure occurs, the maintenance task management apparatus including: a handling determination unit configured to determine whether service interruption of communication due to double failures that are failures of both systems of a redundant apparatus including the communication apparatuses designed with redundancy violates an SLA that is a service level agreement with the users when the double failures are detected; and a handling control unit configured to perform control for transmitting a quick handling notification for requesting quick failure repair to a worker terminal when it is determined that the service interruption violates the SLA.

The disclosure according to a sixth aspect provides a maintenance task management method performed by a maintenance task management apparatus configured to handle a failure when both an apparatus failure that is a failure of communication apparatuses in a nighttime period defined in advance and a service failure that is a trouble in a communication service provided by the communication apparatuses to a communication terminal in the nighttime period occur or only the apparatus failure occurs, the maintenance task management apparatus executing: determining whether service interruption of communication due to double failures that are failures of both systems of a redundant apparatus including the communication apparatuses designed with redundancy violates an SLA that is a service level agreement with users when the double failures are detected; and performing control for transmitting a quick handling notification to a worker terminal when it is determined that the service interruption violates the SLA.

According to the configuration of the first aspect and the method of the sixth aspect, it is determined that the quick failure repair is required and the quick handling notification is provided to the worker terminal if the SLA is violated when the double failures, namely both the apparatus failure and the service failure in the nighttime period are detected. This enables determination of whether the quick repair is required. It is thus possible to reduce the number of workers required to carry out sudden failure handling in a nighttime period of a maintenance site building and to curb operating expenses as follows. For example, if a contract is made in advance with workers Who live near a communication apparatus for repair handling in a nighttime period at lower costs than costs for workers who stay in a maintenance site building, and a quick handling notification is provided to worker terminals such as smartphones that the workers own, it is possible to carry out failure handling at lower costs than those required to cause a necessary number of workers for sudden failure handling to stay in the maintenance site building in the nighttime period. In other words, it is possible to determine whether quick repair handling is required for a failure in the communication apparatus or in a communication service that occurs in the nighttime period in compliance with an SLA while curbing operating expenses.

According to the disclosure of a second aspect, the maintenance task management apparatus according to the first aspect further includes: a service influence checking unit configured to determine that an influence on the users is large when the handling determination unit detects only the apparatus failure or when it is determined that the service interruption does not violate the SLA, and when the number of users influenced at least by the apparatus failure exceeds a first threshold value indicating the number of users defined in advance, in which the handling control unit performs control for transmitting the quick handling notification to the worker terminal when it is determined that the influence on the users is large.

With this configuration, it is possible to determine that the influence on the users is large and to provide the quick handling notification for the quick repair for the apparatus failure to the worker terminal when only the apparatus failure is detected or when it is determined that the service interruption does not violate the SLA, and when the number of users influenced by the apparatus failure exceeds the first value. It is thus possible to perform quick failure repair.

According to the disclosure of a third aspect, the maintenance task management apparatus according to the second aspect further includes: a risk calculation unit configured to calculate a service interruption probability at which the service interruption is caused due to the double failures every time a predetermined time elapses from a time of occurrence of the apparatus failure when the service influence checking unit determines that the number of users influenced by the apparatus failure is equal to or less than the first threshold value and that the influence on the users is not large; an expected recovery time calculation unit configured to calculate an expected recovery time that is a time from when repair is started at a start time in a next daytime period to when recovery is completed, in consideration of a time required to move to the communication apparatus that causes the apparatus failure; and a failure influence determination unit configured to determine that quick failure handling is required in a case in which the service interruption probability in a same time as the calculated expected recovery time exceeds a second threshold value indicating a probability defined in advance, in which the handling control unit performs control for transmitting the quick handling notification to the worker terminal when it is determined that the quick failure handling is required.

With this configuration, it is possible to determine that the quick failure handling is to be performed if the service interruption probability is greater than the second threshold within the expected recovery time from when the repair is started at the start time in the next daytime period, which is a daytime period following the nighttime period, to when the recovery is completed. It is thus possible to more accurately determine the quick failure handling, to shift the failure repair to the next daytime period, and thereby to reduce operating expenses in the nighttime period.

According to the disclosure of a fourth aspect, the maintenance task management apparatus according to the third aspect further includes: a maintenance control unit configured to perform control for transmitting, to the worker terminal, a daytime period handling notification for requesting failure repair in the next daytime period that is a daytime period following the nighttime period when the failure influence determination unit determines that the service interruption probability is equal to or less than the second threshold value.

With this configuration, it is possible to determine that the failure repair handling is to be performed in the next daytime period when the apparatus failure occurs in the nighttime period and the service interruption probability is equal to or less than the second threshold value and is determined to be low. It is thus possible to more accurately determine whether the failure repair handling is required in the nighttime period and thereby to reduce operating expenses in the nighttime period.

According to the disclosure of a fifth aspect, the maintenance task management apparatus according to the fourth aspect further includes: a priority determination unit configured such that in a case in which a failure repair operation in response to the quick handling notification or the daytime period handling notification and a current operation other than the failure repair operation for the communication apparatus are to be performed in a same time period, the priority determination unit determines that an operation with higher priority is to be preferentially performed by comparing priority assigned in advance in accordance with a detail of the failure repair operation with priority assigned in advance to the current operation.

With this configuration, it is possible to appropriately determine which of the current operation and the failure repair operation is prioritized when the failure repair operation for the apparatus failure or the service failure is performed during the current operation for performing maintenance of the communication apparatus.

Effects of the Invention

According to the present disclosure, it is possible to provide a maintenance task management apparatus and a maintenance task management method with which it is possible to determine whether quick repair is required for a failure in a communication apparatus or in a communication service that occurs in a nighttime period in compliance with an SLA while curbing operating expenses.

DESCRIPTION OF EMBODIMENT

An embodiment of the present disclosure will be described below with reference to the drawings. Note that components common throughout the drawings of this specification are denoted by the same reference signs, and descriptions of such components will be omitted as appropriate.

Configuration of Embodiment

Figure 1:
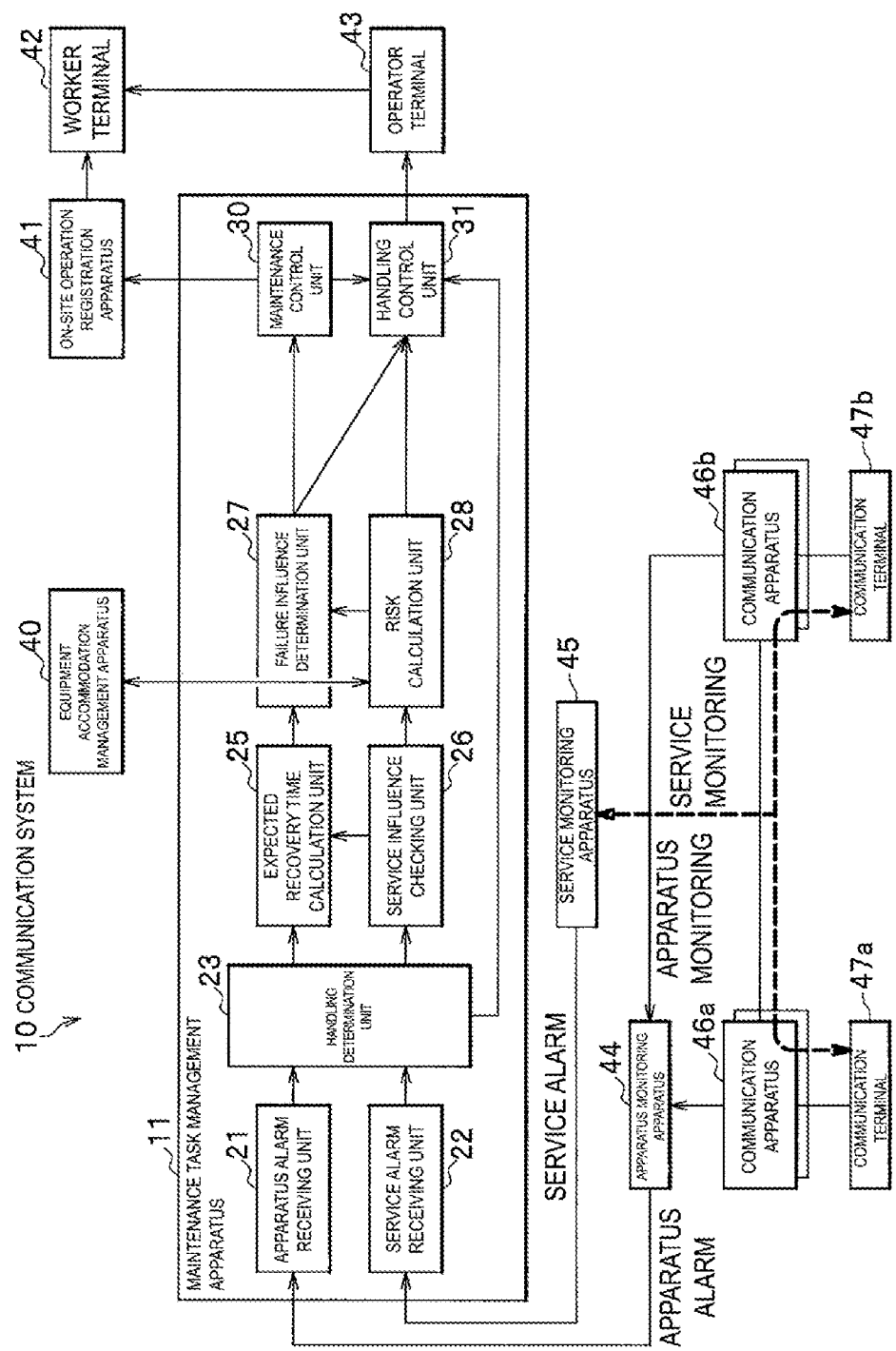
FIG. 1 is a block diagram illustrating a configuration of a communication system to which a maintenance task management apparatus according to an embodiment of the present disclosure is applied.

FIG. 1 is a block diagram illustrating a configuration of a communication system to which a maintenance task management apparatus according to an embodiment of the present disclosure is applied.

A communication system 10 illustrated in FIG. 1 is configured to include a maintenance task management apparatus 11, an equipment accommodation management apparatus 40, an on-site operation registration apparatus 41, a worker terminal 42, an operator terminal 43, an apparatus monitoring apparatus 44, a service monitoring apparatus 45, communication apparatuses 46a and 46b, and communication terminals 47a and 47b of users or the like. The components other than the communication terminals 47a and 47b, that is, the components 11 and 40 to 46 belong to a communication carrier.

The maintenance task management apparatus 11 is adapted to determine whether quick handling is required for a failure in the communication apparatuses 46a and 46b and a trouble (also referred to as a failure) in a communication service provided by the communication apparatuses 46a and 46b that occurs in a nighttime period in compliance with an SLA while curbing operating expenses. The maintenance task management apparatus 11 is configured to include an apparatus alarm receiving unit 21, a service alarm receiving unit 22, a handling determination unit 23, an expected recovery time calculation unit 25, a service influence checking unit 26, a failure influence determination unit 27, a risk calculation unit 28, a maintenance control unit 30, and a handling control unit 31.

The communication apparatuses 46a and 46b are present in a distributed manner in a wide range and are adapted to perform communication services represented by dashed lines, such as data communication, telephone communication, and Ethernet communication, between the communication terminals 47a and 47b. The communication apparatuses 46a and 46b are designed with redundancy with active and spare configurations for the purpose of improving service quality and the like. The communication carrier establishes a 24-hour and 365-day maintenance system by disposing workers who perform a maintenance operation including failure repair in the communication apparatuses 46a and 46b and in a communication service such that appropriate maintenance can be performed.

The apparatus monitoring apparatus 44 monitors operating states of the communication apparatuses 46a and 46b, and in a case in which some kind of failure (also referred to as an apparatus failure) occurs in the communication apparatuses 46a and 46b, the apparatus monitoring apparatus 44 notifies the maintenance task management apparatus 11 of an apparatus alarm including a failure occurrence clock time. Here, the communication apparatuses 46a and 46b are designed with redundancy as described above, and failures of both systems in these redundant apparatuses will be referred to as double failures. A service to users is interrupted due to the system failures of both systems, and this develops into a service failure (service alarm).

The service monitoring apparatus 45 monitors an operating state of a communication service provided by the communication apparatuses 46a and 46b, and in a case in which some kind of trouble (also referred to as a service failure) occurs in the communication service, the service monitoring apparatus 45 notifies the maintenance task management apparatus 11 of a service alarm including a failure occurrence clock time.

The apparatus alarm receiving unit 21 of the maintenance task management apparatus 11 receives the apparatus alarm and outputs the apparatus alarm to the handling determination unit 23. The service alarm receiving unit 22 receives the service alarm and outputs the service alarm to the handling determination unit 23.

In a case in which the failure occurrence clock time of the apparatus alarm or the service alarm is in a nighttime period, the handling determination unit 23 determines whether double failures occur, which cause both of the apparatus alarm and the service alarm to be generated. Further, the handling determination unit 23 determines whether the service interruption time that occurs when the double failures occur violates the aforementioned SLA (SLA violation). As a result, in the case of an SLA violation, the handling determination unit 23 outputs, to the handling control unit 31, a quick handling notification for quickly performing failure repair for both the communication apparatuses 46a and 46b and the communication service. However, a case in which the SLA is not violated will be referred to as SLA non-violation.

The handling control unit 31 that has received the quick handling notification requests the worker terminal 42 to repair both of the failures via the operator terminal 43. The worker terminal 42 is a communication terminal such as a mobile phone, a smartphone, or a tablet that the worker owns.

The equipment accommodation management apparatus 40 stores and manages, in a storage device (not illustrated), information regarding apparatus identifications (IDs) of the communication apparatuses 46a and 46b, the number of users accommodated by the communication apparatuses 46a and 46b, important telephone lines for emergency numbers such as 110 and 119, past failure records and mean time between failures (MTBF) values indicating average failure intervals of the communication apparatuses 46a and 46b, and the like.

The on-site operation registration apparatus 41 stores and manages, in a storage device (not illustrated), information regarding on-site workers such as worker Ms, worker staying locations, areas where workers can move to the distributed communication apparatuses 46a and 46b in a predetermined time, and handling available operation times that are times during which the workers can work on repair, and the like.

In a case in which the handling determination unit 23 determines that double failures do not occur or determines an SLA non-violation after a determination of double failures, the service influence checking unit 26 of the maintenance task management apparatus 11 checks (determines) whether an influence on the users is large (also referred to as a large user influence), which will be described later.

The aforementioned case in which double failures do not occur is a case in which only an apparatus failure occurs and a communication service is provided normally. The large user influence means that an adverse influence on the users is large. For example, the number of users influenced by a trouble caused by an apparatus failure exceeds a first threshold value indicating the predetermined number of users, or communication services using important telephone lines for emergency numbers such as 110 and 119 are adversely influenced.

In a case in which the service influence checking unit 26 determines that the user influence is not large, the risk calculation unit 28 calculates a risk of service interruption (in other words, a service interruption probability is calculated) caused by the double failures every time a predetermined time elapses from the apparatus failure clock time on the basis of the past failure records and the MTBF values of the communication apparatuses 46a and 46b stored in the equipment accommodation management apparatus 40. For example, the probability at which the service interruption can occur (service interruption probability) is calculated every one hour. However, "every time a predetermined time elapses" can refer to the elapse of different time intervals, such as 30 minutes, 1 hour, or 2 hours.

After the aforementioned determination that the user influence is not large, the expected recovery time calculation unit 25 calculates an expected recovery time that is a time from when repair is started at the start time in the next daytime period to when recovery is completed, in consideration of the time required for a worker to move to a building where the communication apparatuses 46a and 46b are accommodated from a maintenance site building where the worker stays.

The failure influence determination unit 27 determines that quick failure handling is required in a case in which the service interruption probability in the same time as the expected recovery time calculated by the expected recovery time calculation unit 25 exceeds a second threshold value indicating a predetermined probability and outputs a quick handling notification to the handling control unit 31. The handling control unit 31 that has received the quick handling notification requests the worker terminal 42 to perform failure repair for the communication apparatuses 46a and 46b via the operator terminal 43.

On the other hand, in a case in which the service interruption probability in the same time as the aforementioned expected recovery time is equal to or less than the second threshold value, the failure influence determination unit 27 determines that it is possible to handle the failure in the daytime period and outputs a daytime period handling notification for carrying out failure handling in the next daytime period to the maintenance control unit 30. The maintenance control unit 30 that has received the daytime period handling notification registers information on the daytime period handling notification in the on-site operation registration apparatus 41. The on-site operation registration apparatus 41 transmits the registered information on the daytime period handling notification to the worker terminal 42 and requests to carry out failure repair for the communication apparatuses 46a and 46b in the next daytime period.

Here, how the aforementioned second threshold value is set will be described. For example, it is assumed that an apparatus failure occurs at 1 a.m. In a nighttime period, that failure repair is started at 9 a.m., which is in a next daytime period, that a recovery clock time obtained in consideration of a time for movement and a time for repair is 12 p.m., and that the recovery time period required for the recovery at that time is 3 hours. In this case, 11 hours have elapsed from 1 a.m., which is the apparatus failure clock time, to 12 p.m., which is the recovery clock time. The risk calculation unit 28 calculates an approximate percentage of the probability (service interruption probability) at which double failures occur within those 11 hours. It is assumed that the probability is 1%, for example.

Because the aforementioned recovery time period is 3 hours, it is assumed that the probability (service interruption probability) at which double failures occur in 3 hours is 0.01% in a case in which the apparatus is recovered in the nighttime period at 4 a.m that is 3 hours from 1 a.m., which is the apparatus failure clock time.

Because the service interruption probability from 1 a.m., when the apparatus failure occurs, to 12 p.m., when the apparatus is recovered, in the case of the aforementioned daytime period handling is 1%, it is possible to regard the risk as being low.

In this case, if the second threshold value is set to 1.5%, for example, the failure influence determination unit 27 determines that repair can be done through the next daytime period handling when the service interruption probability calculated by the risk calculation unit 28 is less than 1.5%. In the case of this example, it is determined that the daytime period handling is to be done because the probability of double failures in the case of the daytime period handling is 1%, which is equal to or less than 1.5% as described above.

On the other hand, if the second threshold value is set to 0.5%, the failure influence determination unit 27 determines that the nighttime period handling is to be done in the case of this example because the probability at which double failures occur in the case of the daytime period handling is 1%, which exceeds 0.5%.

Operation in Embodiment

An operation for failure handling performed by the maintenance task management apparatus 11 according to the present embodiment when both an apparatus failure and a service failure occur or only the apparatus failure occurs will be described with reference to the sequence diagram in FIG. 2.

However, it is assumed that the apparatus monitoring apparatus 44 detects the apparatus failure in the nighttime period and transmits an apparatus alarm and that the apparatus alarm is received by the apparatus alarm receiving unit 21 of the maintenance task management apparatus 11. It is also assumed that the service monitoring apparatus 45 detects the service failure in the nighttime period and transmits a service alarm and that the service alarm is received by the service alarm receiving unit 22. As a precondition, both of the received apparatus alarm and the received service alarm or only the received apparatus failure is output to the handling determination unit 23.

Figure 2:
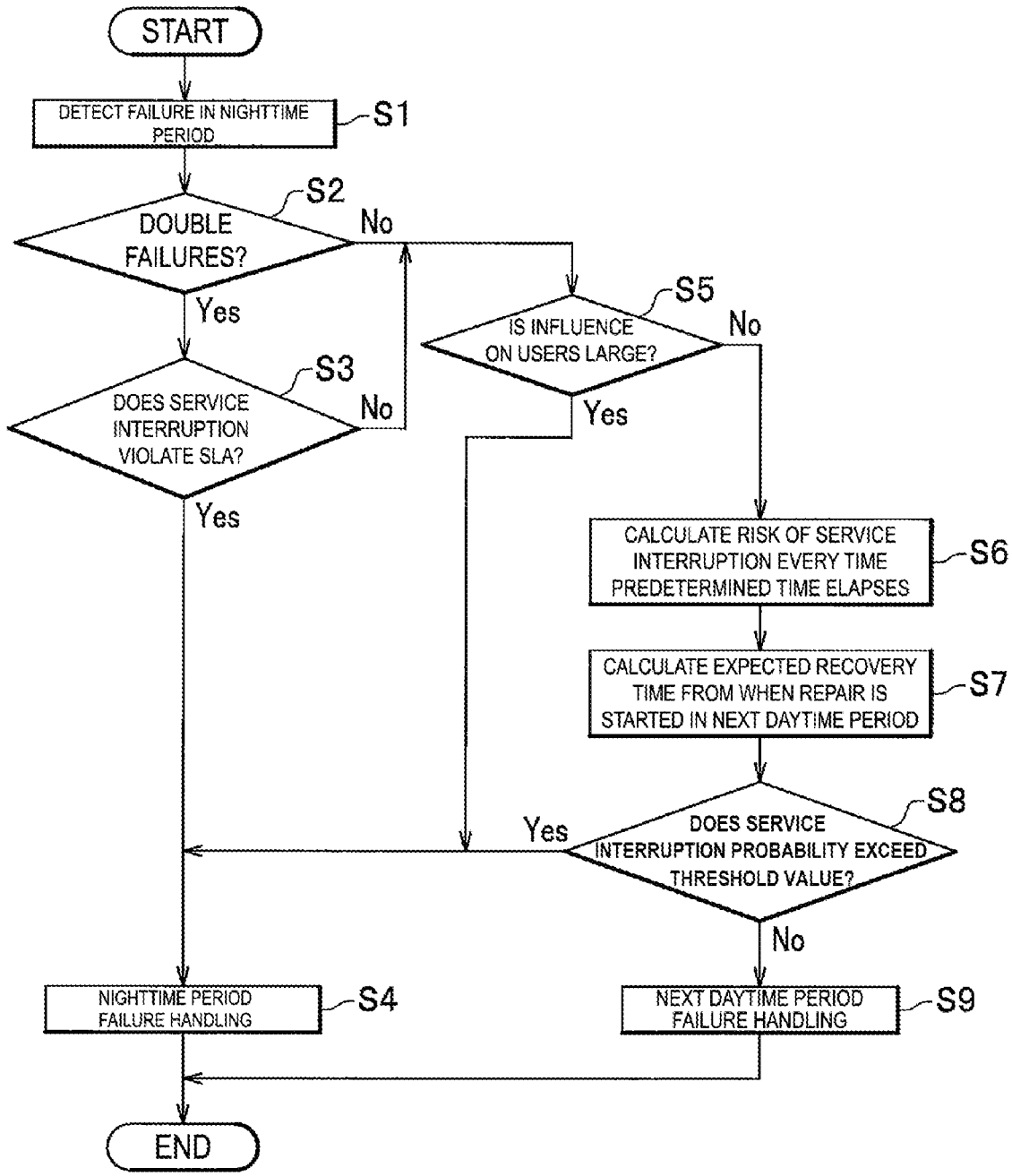
FIG. 2 is a sequence diagram for describing an operation of handling a failure performed by the maintenance task management apparatus according to the embodiment when both an apparatus failure and a service failure occur or only an apparatus failure occurs.

In Step S1 illustrated in FIG. 2, it is assumed that the handling determination unit 23 detects both the apparatus alarm and the service alarm or only the apparatus alarm that has been generated in the nighttime period.

In Step S2, the handling determination unit 23 determines whether double failures, due to which both the apparatus alarm and the service alarm have been received, occur.

As a result, in the case of the double failures (Yes), the handling determination unit 23 determines whether service interruption due to the double failures violates an SLA in Step S3.

In the case of an SLA violation (Yes), the nighttime period failure handling is executed as follows in Step S4. In other words, the handling determination unit 23 notifies the operator terminal 43 of a quick handling notification via the handling control unit 31. The operator terminal 43 that has received the notification transmits a notification for repair handling for the communication apparatuses 46a and 46b and the communication service designated by the quick handling notification to the worker terminal 42 through an operator's operation. The worker who has received this notification performs quick failure handling in the nighttime period.

On the other hand, in a case in which the handling determination unit 23 determines that double failures do not occur (No) in Step S2 described above, or in a case in which SLA non-violation is determined (No) in Step S3, the service influence checking unit 26 determines whether the user influence is large in Step S5.

As a result, if the user influence is large (Yes), the nighttime period failure handling is executed as described above in Step S4.

On the other hand, in a case in which the service influence checking unit 26 determines that the user influence is not large (No) in Step S5, the risk calculation unit 28 calculates a risk of service interruption (double failures) every time a predetermined time elapses as follows in Step S6. In other words, the risk calculation unit 28 calculates a risk of the service interruption (service interruption probability) every time a predetermined time elapses from the apparatus failure clock time on the basis of the past failure records and the MTBF values of the communication apparatuses 46a and 46b stored in the equipment accommodation management apparatus 40. For example, the service interruption probability at which the service interruption occurs is calculated every 30 minutes from the apparatus failure clock time.

Next, in Step S7, the expected recovery time calculation unit 25 calculates an expected recovery time that is a time from when repair is started at the start time in the next daytime period to when recovery is completed, in consideration of the time required for the worker to move from the maintenance site building where the worker stays to the building that accommodates the communication apparatuses 46a and 46b.

In a case in which the failure influence determination unit 27 determines that the service interruption probability in the same time as the expected recovery time calculated in Step S7 exceeds the threshold value (second threshold value) (Yes) in Step S8, the nighttime period failure handling is executed as described above in Step S4.

On the other hand, in a case in which the failure influence determination unit 27 determines that the service interruption probability does not exceed the threshold value (second threshold value) (No) in Step S8, the next daytime period failure handling is performed as follows in Step S9. In other words, the failure influence determination unit 27 determines that the daytime period handling is possible in a case in which the service interruption probability is equal to or less than the threshold value and outputs a daytime period handling notification for carrying out the failure handling in the next daytime period to the maintenance control unit 30. The maintenance control unit 30 that has received the daytime period handling notification registers information on the daytime period handling notification in the on-site operation registration apparatus 41. The on-site operation registration apparatus 41 transmits the registered information on the daytime period handling notification to the worker terminal 42 and requests to carry out failure repair for the communication apparatuses 46a and 46b in the next daytime period.

Effects of Embodiment

Effects of the maintenance task management processing performed by the maintenance task management apparatus 11 according to the present embodiment will be described. The maintenance task management apparatus 11 determines handling of failures when both an apparatus failure that is a failure in the communication apparatuses 46a and 46b in a predetermined nighttime period and a service failure that is a trouble in a communication service provided by the communication apparatuses 46a and 46b to users in the predetermined nighttime period occur or only the apparatus failure occurs. Characteristic configurations in the embodiment will be described.

(1) The maintenance task management apparatus H includes the handling determination unit 23 configured to determine whether service interruption of communication due to double failures, which are failures of both systems of a redundant apparatus including the communication apparatuses designed with redundancy, violates an SLA that is a service level agreement with users when the double failures are detected. The maintenance task management apparatus 11 also includes the handling control unit 31 configured to perform control for transmitting a quick handling notification for requesting quick failure repair to the worker terminal 42 when the SLA violation is determined.

With this configuration, it is determined that the quick failure repair is required and the quick handling notification is provided to the worker terminal 42 when the double failures, namely both the apparatus failure and the service failure in the nighttime period are detected and the SLA is violated. This enables determination of whether the quick repair is required. It is thus possible to reduce the number of workers required to carry out sudden failure handling in a nighttime period of a maintenance site building and to curb operating expenses as follows. For example, if a contract is made in advance with workers who live near the communication apparatuses 46a and 46b for repair handling in a nighttime period at lower costs than costs for workers who stay in a maintenance site building, and a quick handling notification is provided to the worker terminal 42 such as smartphones that the workers own, it is possible to carry out failure handling at lower costs. In other words, it is possible to carry out the failure handling at lower costs than costs required to cause a necessary number of workers for sudden failure handling in the nighttime period to stay in the maintenance site building. It is thus possible to determine whether quick repair handling is required for a failure in the communication apparatuses 46a and 46b and the communication service that occurs in the nighttime period in compliance with the SLA while curbing operating expenses.

(2) The maintenance task management apparatus 11 includes the service influence checking unit 26 configured to determine that the user influence is large when the handling determination unit 23 detects only the apparatus failure or determines the SLA non-violation, and when the number of the users influenced at least by the apparatus failure exceeds the first threshold value indicating the predetermined number of the users. In this case, the handling control unit 31 is configured to perform control for transmitting a quick handling notification for requesting quick failure repair to the worker terminal 42 when it is determined that the user influence is large.

With this configuration, it is possible to determine that the user influence is large and to provide the quick handling notification for quick repair for the apparatus failure to the worker terminal 42 when only the apparatus failure is detected or when the SLA non-violation is determined, and when the number of users influenced by the apparatus failure exceeds the first threshold value. It is thus possible to carry out rapid failure repair.

(3) The maintenance task management apparatus 11 includes the risk calculation unit 28, the expected recovery time calculation unit 25, and the failure influence determination unit 27. The risk calculation unit 28 calculates the service interruption probability at which the service interruption due to the double failures occur every time a predetermined time elapses from the clock time of the apparatus failure when the service influence checking unit 26 determines that the number of users influenced by the apparatus failure is equal to or less than the first threshold value and that the user influence is not large.

The expected recovery time calculation unit 25 calculates an expected recovery time that is a time from when repair is started at the start time in the next daytime period to when the recovery is completed in consideration of the time required to move to the communication apparatuses 46a and 46b causing an apparatus failure.

The failure influence determination unit 27 determines that the quick failure handling is required in a case in which the service interruption probability in the same time as the aforementioned calculated expected recovery time exceeds the second threshold value.

When these components are further provided, the handling control unit 31 is configured to perform control for transmitting the quick handling notification to the worker terminal 42 if it is determined that the quick failure handling is required.

With this configuration, it is possible to determine that the quick failure handling is to be performed if the service interruption probability is greater than the second threshold within an expected recovery time from when repair is started at the start time in the next daytime period, which is a daytime period following the nighttime period, to when the recovery is completed. This enables more accurate determination of quick failure handling and enables shift of failure repair to the nighttime period or the next daytime period. Thus, it is possible to reduce operating expenses in the nighttime period.

(4) The maintenance task management apparatus 11 includes the maintenance control unit 30 configured to perform control for transmitting a daytime period handling notification for requesting failure repair in the next daytime period, which is a daytime period following the nighttime period, to the worker terminal 42 when the failure influence determination unit 27 determines that the service interruption probability is equal to or less than the second threshold value.

With this configuration, it is possible to determine that the failure repair handling is to be performed in the next daytime period when the apparatus failure occurs in the nighttime period and the service interruption probability is equal to or less than the second threshold value and is determined to be low. It is thus possible to more accurately determine whether the failure repair handling is required in the nighttime period and thereby to reduce operating expenses in the nighttime period.

Modification Example of Embodiment

Figure 3:
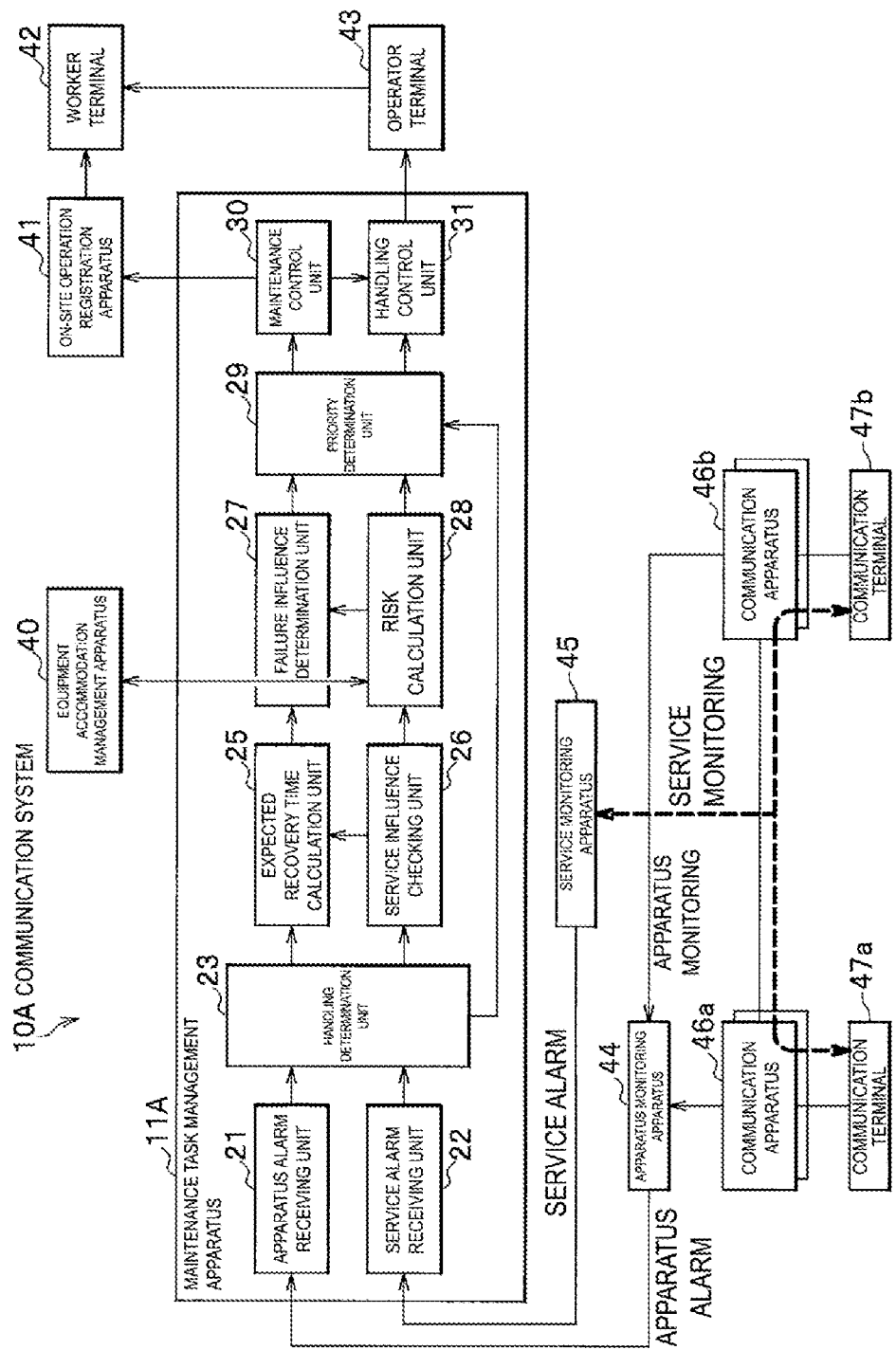
FIG. 3 is a block diagram illustrating a configuration of a communication system to which a maintenance task management apparatus according to a modification example of the embodiment is applied.

FIG. 3 is a block diagram illustrating a configuration of a communication system to which a maintenance task management apparatus according to a modification example of the embodiment of the present disclosure is applied.

A maintenance task management apparatus 11A of a communication system 10A according to a modification example illustrated in FIG. 3 is different from the aforementioned maintenance task management apparatus 11 (FIG. 1) in that the maintenance task management apparatus 11A further includes a priority determination unit 29. The priority determination unit 29 is connected to the handling determination unit 23 and is also connected between the failure influence determination unit 27 and the risk calculation unit 28 and between the maintenance control unit 30 and the handling control unit 31.

The priority determination unit 29 is configured such that in a case in which a failure repair operation in response to the quick handling notification or the daytime period handling notification and a current operation other than the failure repair operation for the communication apparatus 46a and 46b are to be performed in the same time period, the priority determination unit 29 determines that an operation with higher priority is to be performed with priority by comparing priority assigned in advance in accordance with a detail of the failure repair operation with priority assigned in advance to the current operation. Here, the failure repair means failure repair in response to a quick handling notification for an apparatus failure or a service failure or failure repair in response to a quick handling notification or a daytime period handling notification for an apparatus failure. The current operation is a current operation that is being currently performed or to be performed on the communication apparatuses 46a and 46b.

Operation of Modification Example of Embodiment

An operation of failure handling performed by the maintenance task management apparatus 11 including the priority determination unit 29 when both an apparatus failure and a service failure occur or only the apparatus failure occurs will be described with reference to the sequence diagram in FIG. 4. However, the same reference signs will be applied to steps in the sequence diagram in FIG. 4 corresponding to steps in the sequence diagram in FIG. 2, and description thereof will be omitted.

Figure 4:
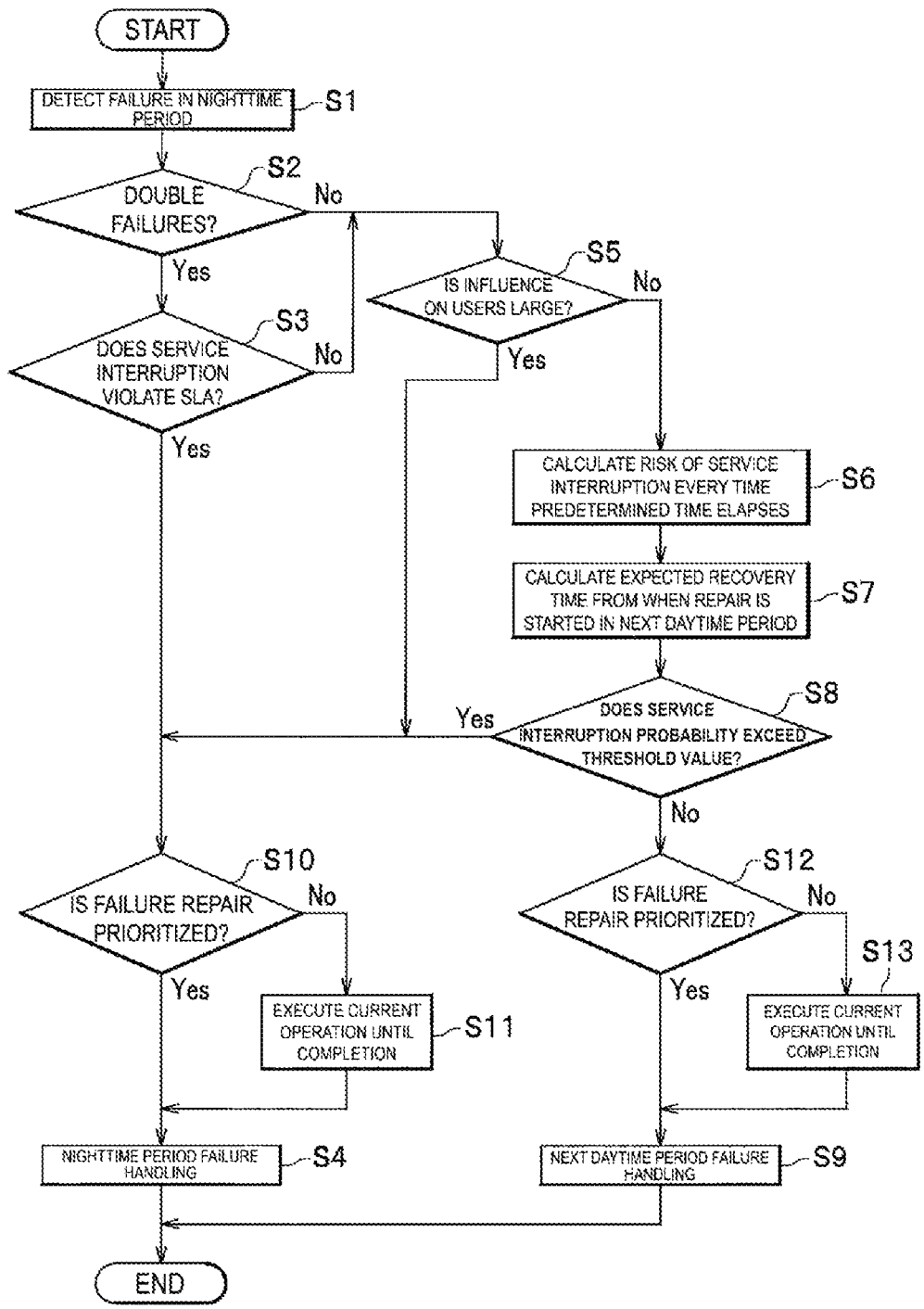
FIG. 4 is a sequence diagram for describing an operation of handling a failure performed by the maintenance task management apparatus according to the modification example of the embodiment when both an apparatus failure and a service failure occur or only an apparatus failure occurs.

In a case in which the handling determination unit 23 determines that the service interruption due to the double failures violates the SLA (Yes) in Step S3 illustrated in FIG. 4, the handling determination unit 23 outputs a quick handling notification to the priority determination unit 29 in Step S10. The priority determination unit 29 determines which of the current operation and the failure repair related to the quick handling notification is prioritized through priority determination processing. In a case in which the failure repair is prioritized (Yes) as a result, the nighttime period failure handling in Step S4 is performed.

In a case in which it is determined that the current operation is prioritized (No) in Step S10 described above, the current operation is executed until completion in Step S11, and the nighttime period failure handling in Step S4 is then performed.

In a case in which the failure influence determination unit 27 determines that the service interruption probability in the same time as the expected recovery time calculated in Step S7 exceeds the threshold value (second threshold value) (Yes) in Step S8, the same processing as that described above is performed in Steps S10, S11, and S4.

On the other hand, in a case in which the failure influence determination unit 27 determines that the service interruption probability is equal to or less than the threshold value (second threshold value) (No) in Step S8, the failure influence determination unit 27 outputs a daytime period handling notification to the priority determination unit 29 in Step S12. The priority determination unit 29 determines which of the current operation and the failure repair regarding the daytime period handling notification is prioritized through priority determination processing. In a case in which it is determined that the failure repair is prioritized (Yes) as a result, the daytime period failure handling in Step S9 is performed.

In a case in which it is determined that the current operation is prioritized (No) in Step S12, the current operation is executed until completion in Step S13, and the daytime period failure handling in Step S9 is then performed.

Effect of Modification Example of Embodiment

According to the maintenance task management apparatus 11 including the aforementioned priority determination unit 29, it is possible to appropriately determine which of a current operation and a failure repair operation is prioritized when the failure repair operation for an apparatus failure or a service failure occurs during the current operation for maintenance of the communication apparatuses 46a and 46b. In a case in which there is a request for a failure repair operation in the next daytime period and an operation other than the failure repair operation is scheduled in the next daytime period at this time, it is possible to appropriately determine which of the operations is prioritized.

In addition, a specific configuration can be changed as appropriate without departing from the spirit of the present disclosure.

REFERENCE SIGNS LIST 10, 10A Communication system
11, 11A Maintenance task management apparatus
21 Apparatus alarm receiving unit
22 Service alarm receiving unit
23 Handling determination unit
25 Expected recovery time calculation unit
26 Service influence checking unit
27 Failure influence determination unit
28 Risk calculation unit
29 Priority determination unit
30 Maintenance control unit
31 Handling control unit
40 Equipment accommodation management apparatus
41 On-site operation registration apparatus
42 Worker terminal
43 Operator terminal
44 Apparatus monitoring apparatus
45 Service monitoring apparatus
46a, 46b Communication apparatus
47a, 47b Communication terminal

The invention claimed is:

1. A maintenance task management apparatus configured to determine handling of a failure based on both (i) an apparatus failure that is a failure of communication apparatuses in a predefined period and (ii) a service failure that is a trouble in a communication service provided by the communication apparatuses to users in the predefined period occurring, the maintenance task management apparatus comprising:
a handling determination unit, implemented using one or more computing devices, configured to determine, based on both of the apparatus failure and the service failure being detected at a predefined time period, whether a service interruption of communication due to both of the apparatus failure and the service failure violates a service level agreement (SLA) with the users; and
a handling control unit, implemented using one or more computing devices, configured to, based on a determination that the service interruption of communication due to both of the apparatus failure and the service failure violates the SLA, perform control for transmitting a quick handling notification for requesting quick failure repair to a worker terminal.

2. The maintenance task management apparatus according to claim 1, further comprising:
a service influence checking unit, implemented using one or more computing devices, configured to determine that an influence on the users is large based on the handling determination unit detecting only the apparatus failure or based on the service interruption not being determined to violate the SLA, and based on a number of users influenced at least by the apparatus failure exceeds a first threshold value indicating a number of users defined in advance,
wherein the handling control unit is configured to perform control for transmitting the quick handling notification to the worker terminal based on a determination that the influence on the users is large.

3. The maintenance task management apparatus according to claim 2, further comprising:
a risk calculation unit, implemented using one or more computing devices, configured to calculate a service interruption probability at which the service interruption is caused due to both of the apparatus failure and the services failure every time a predetermined time elapses from a time of occurrence of the apparatus failure based on the service influence checking unit determining that the number of users influenced by the apparatus failure is equal to or less than the first threshold value and that the influence on the users is not large;

an expected recovery time calculation unit, implemented using one or more computing devices, configured to calculate an expected recovery time that is a time from when repair is started at a start time in a next daytime period to when recovery is completed, in consideration of a time required to move to the communication apparatus that causes the apparatus failure; and a failure influence determination unit, implemented using one or more computing devices, configured to determine that quick failure handling is required in a case in which the service interruption probability in a same time as the calculated expected recovery time exceeds a second threshold value indicating a probability defined in advance, wherein the handling control unit is configured to perform control for transmitting the quick handling notification to the worker terminal based on the quick failure handling being determined to be required.

4. The maintenance task management apparatus according to claim 3, further comprising:

a maintenance control unit, implemented using one or more computing devices, configured to perform control for transmitting, to the worker terminal, a daytime period handling notification for requesting failure repair in the next daytime period that is a daytime period following the predefined period based on the failure influence determination unit determining that the service interruption probability is equal to or less than the second threshold value.

5. The maintenance task management apparatus according to claim 4, further comprising:

a priority determination unit, implemented using one or more computing devices, configured such that in a case in which a failure repair operation in response to the quick handling notification or the daytime period handling notification and a current operation other than the failure repair operation for the communication apparatus are to be performed in a same time period, the priority determination unit is configured to determine that an operation with higher priority is to be preferentially performed by comparing priority assigned in advance in accordance with a detail of the failure repair operation with priority assigned in advance to the current operation.

6. A maintenance task management method performed by a maintenance task management apparatus configured to handle a failure based on both (i) an apparatus failure that is a failure of communication apparatuses in a predefined period and (ii) a service failure that is a trouble in a communication service provided by the communication apparatuses to a communication terminal in the predefined period occurring, the maintenance task management method comprising:

determining, based on both of the apparatus failure and the service failure being detected at a predefined time period, whether a service interruption of communication due to both of the apparatus failure and the service failure violates a service level agreement (SLA) with users; and performing control for transmitting a quick handling notification to a worker terminal based on a determination that the service interruption of communication due to both of the apparatus failure and the service failures violates the SLA.

7. The maintenance task management method according to claim 6, further comprising:

determining that an influence on the users is large based on detecting only the apparatus failure or based on the service interruption not being determined to violate the SLA, and based on a number of users influenced at least by the apparatus failure exceeds a first threshold value indicating a number of users defined in advance; and performing control for transmitting the quick handling notification to the worker terminal based on the influence on the users being determined large.

8. The maintenance task management method according to claim 7, further comprising:

calculating a service interruption probability at which the service interruption is caused due to both of the apparatus failure and the service failure every time a predetermined time elapses from a time of occurrence of the apparatus failure based on determining that the number of users influenced by the apparatus failure is equal to or less than the first threshold value and that the influence on the users is not large;

calculating an expected recovery time that is a time from when repair is started at a start time in a next daytime period to when recovery is completed, in consideration of a time required to move to the communication apparatus that causes the apparatus failure;

determining that quick failure handling is required in a case in which the service interruption probability in a same time as the calculated expected recovery time exceeds a second threshold value indicating a probability defined in advance; and performing control for transmitting the quick handling notification to the worker terminal based on the quick failure handling being determined to be required.

9. The maintenance task management method according to claim 8, further comprising:

performing control for transmitting, to the worker terminal, a daytime period handling notification for requesting failure repair in the next daytime period that is a daytime period following the predefined period based on determining that the service interruption probability is equal to or less than the second threshold value.

10. The maintenance task management method according to claim 9, further comprising:

determining, in a case in which a failure repair operation in response to the quick handling notification or the daytime period handling notification and a current operation other than the failure repair operation for the communication apparatus are to be performed in a same time period, that an operation with higher priority is to be preferentially performed by comparing priority assigned in advance in accordance with a detail of the failure repair operation with priority assigned in advance to the current operation.

* * * * *